Feb. 19, 1952     O. R. ANGELL     2,586,141
FISH LURE
Filed May 4, 1949

Inventor
Otis R. Angell

Patented Feb. 19, 1952

2,586,141

UNITED STATES PATENT OFFICE 2,586,141

FISH LURE

Otis R. Angell, North Quincy, Mass.

Application May 4, 1949, Serial No. 91,290

3 Claims. (Cl. 43—42.21)

This invention pertains to fish lures of the type wherein parts are moved by the action of the water as the lure is pulled along so as to simulate the sparkle of light reflected from the fins and scales of swimming fish.

One object of the invention is to provide a lure of simple and inexpensive construction which, when it is drawn through the water, produces an optical effect resembling that resultant from the movements of a swimming minnow or other fish. A further object is to provide a lure comprising rotating parts which reflect light to provide a sparkle effect but with the moving parts so arranged and designed that they are not subject to injury when a fish strikes. A further object is to provide a fish lure comprising a rotatable, multiblade, propeller-like spinner and a body of sufficient weight and so shaped as to keep the spinner submerged during use. Other and further objects and advantages of the invention will be pointed out in the following more detailed description and by reference to the accompanying drawings wherein:

Figure 1:
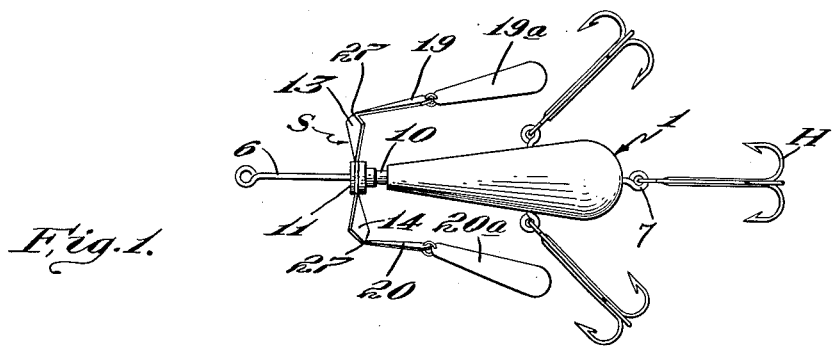
Fig. 1 is a side elevation of a lure embodying the invention.

Referring to the drawings, the numeral 1 designates the body of the lure. Desirably this body is of substantial weight so as to keep the lure submerged when in use. However, it may be made of various materials, for example ceramics, synthetic plastics, or other materials having the desired characteristics, although desirably it is made of metal, preferably of a kind which will not be corroded from the action of sea water. The shape of the body is such that if of metal, it may be readily made on an automatic lathe or screw machine, thus insuring low production cost. In Fig. 1 this body is of elongate plummet shape consisting, for example, of a unitary length of metal such as stainless steel. This body may be made from bar stock and is here shown as having a circular, transverse section tapering toward its forward end. Its outer surface is smooth and preferably polished. The body has an axial bore through it. Preferably a spindle 6 of stiff metal wire is arranged in the axial bore, this spindle having a loop or other device 7 at one end to which the hook H may be connected and having an eye or loop at its forward end to which the line may be connected. Preferably an anti-friction element 9, for instance a glass bead is interposed between the rear end of the body and the loop 7, or if, the line is knotted to the hook, then the bead will be between the body and the knot. Another anti-friction element, such as a glass bead 10, may be arranged at the forward end of the body (Fig. 1).

Figure 3:
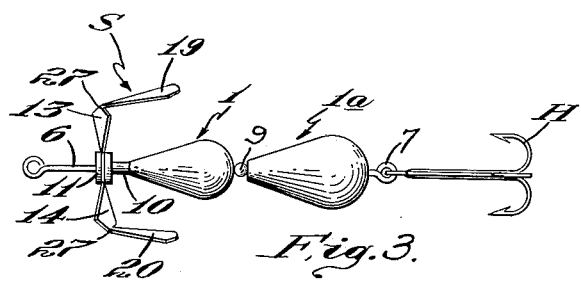
Fig. 3 is a side elevation illustrating a modification.

If desired the body may be formed in two parts 1 and 1a as shown in Fig. 3.

Figure 2:
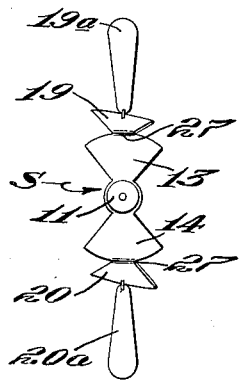
Fig. 2 is an end elevation of the lure of Fig. 1, parts being omitted.

The hub portion 11 of a multiblade propeller-like spinner S bears against the anti-friction element 10, the hub turning freely on the spindle 6. The spinner S may be of any suitable material, for example sheet metal, glass or synthetic plastic. As shown in Figs. 1 to 3, it comprises two radiating, blade-like arms 13 and 14 (although it may have more). Whatever the material, it is desirable that the propeller blades have polished surfaces so as to reflect light. Mirror-finish stainless steel is desirable since it does not corrode.

Light reflecting elements 19 and 20 are loosely (that is to say, movably) connected to the spinner S. As shown in Figs. 1 and 3. The blades 13 and 14 and the elements 19 and 20 of the spinner S may be formed of one sheet of material and a flexible hinge portion 27 provided between the elements and the blades which will allow the elements 19 and 20 to flutter relatively to the blades 13 and 14. The light-reflecting elements 19 and 20 may be of any suitable material and of any desired shape. For instance they may be of glass, synthetic resin, bone or the like. Each reflecting element is an elongate strip of thin material, for instance stainless steel, or ordinary steel chrome-plated. Preferably each element 19, 20 is twisted longitudinally to cause it to tend to turn or flutter when drawn through the water. If desired the members 19, 20 may be twisted to such an extent as to form open spirals, or, on the other hand, they may be substantially flat and without twist. If it be desired, two of the light-reflecting elements may be connected in tandem as shown in Figs. 1 and 2. In this case the forward light-reflecting elements 19 and 20 are connected to the lure in any of the previously described ways and the rear elements 19a and 20a are connected with the forward element in the same manner or any other suitable manner.

When the lure is attached to a line and drawn through the water the light reflecting elements 19, 20 travel about the axis of the spindle, causing them to flutter or rotate relatively to the blades or arms to which they are attached and producing a multitude of irregular flashes of light. The combined result is suggestive of a large fish pursing a group of minnows and provides a lure which is most attractive to hungry fish.

While certain desirable embodiments of the invention have been illustrated and described by way of example, it is to be understood that the invention is capable of embodiment in other modified constructions and by the use of other materials all within the scope of the appended claims.

I claim:

1. In combination in a fish lure, a body comprising at least one elongate plummet-shaped portion tapering in diameter toward its forward end, the body portion having an axial bore and a smooth peripheral surface devoid of irregularities, a spindle passing through the bore in the body portion, the latter being free to turn on the spindle, the spindle having provision on its opposite ends for connection to a hook and line respectively, a spinner having substantially radial, propeller-like blades arranged just in advance of the body portion, each blade of the propeller having an integral, elongate extension united to it by a flexible hinge portion, each of said extensions being longitudinally twisted and tending to flutter when the lure is drawn through the water, said extensions normally diverging rearwardly at an angle approximating the angle of taper of the plummet-shaped body portion.

2. In combination in a fish lure, a body comprising at least one plummet-shaped part having an axial bore and which is arranged with its smaller end in advance, said plummet-shaped part having a smooth peripheral surface devoid of projections or irregularities, a spindle passing through the axial bore in said body part, the spindle having provision at its opposite ends for connecting a hook and line respectively, a spinner having radial propeller-like blades arranged to turn freely on the spindle adjacent to the smaller end of said plummet-shaped body part, each blade of the propeller having an elongate, integral light-reflecting extension flexibly connected to the tip of the blade proper, said extensions normally diverging rearwardly at a predetermined angle such that their rear ends are widely spaced from the peripheral surface of the body portion, and a light-reflecting element loosely connected to the rear end of each of said extensions.

3. In combination in a fish lure, a body comprising a pair of plummet-shaped parts disposed in tandem relation with their smaller ends in advance, each of said plummet-shaped parts having an axial bore, said bores being in alignment, a spindle passing through said axial bores and upon which said body portions are free to rotate, the spindle having provision at its opposite ends for the attachment of a line and a hook respectively, a spinner having radial, propeller-like blades and a hub, the hub being free to turn on the spindle at a point adjacent to the smaller end of the forward, plummet-shaped body part, each blade of the propeller having an elongate, integral light-reflecting extension flexibly united to its tip and normally diverging rearwardly at an angle such that the free rearward ends of said extensions are widely spaced from the peripheral surface of the forward body portion.

OTIS R. ANGELL.

REFERENCES CITED

The following references are of record in the file of this patent:

UNITED STATES PATENTS

| Number | Name | Date |
|---|---|---|
| 295,350 | Chapman | Mar. 18, 1884 |
| 1,682,710 | Pflueger | Aug. 28, 1928 |
| 1,758,344 | Wright et al. | May 13, 1930 |
| 1,820,887 | Pflueger | Aug. 25, 1931 |